June 19, 1973     H. A. CHRISTOPHER     3,740,206
METHOD FOR MAKING SEALED CONTAINER FOR ELEMENTAL
SODIUM AND METHOD OF FORMING
Original Filed March 27, 1969
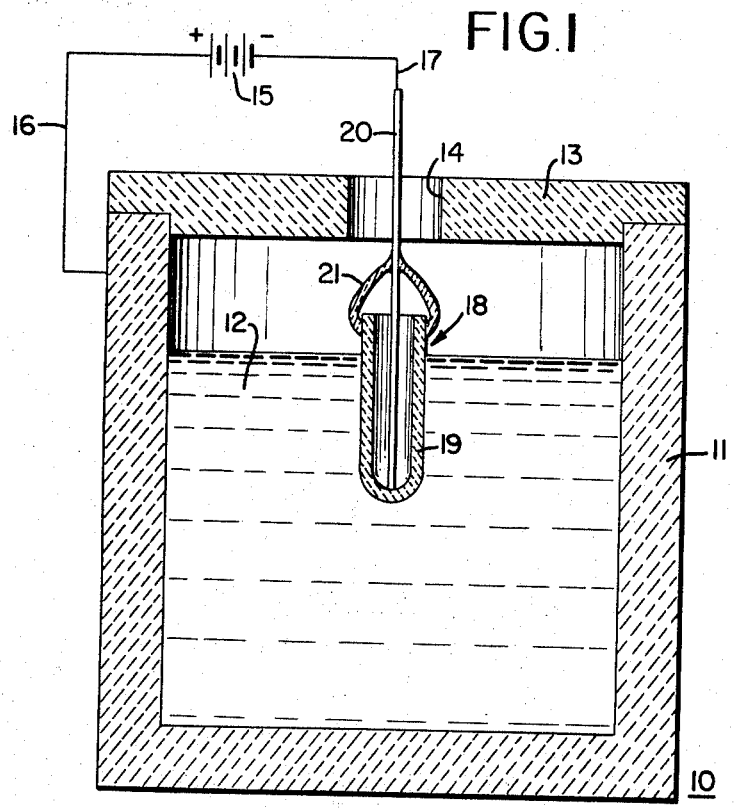
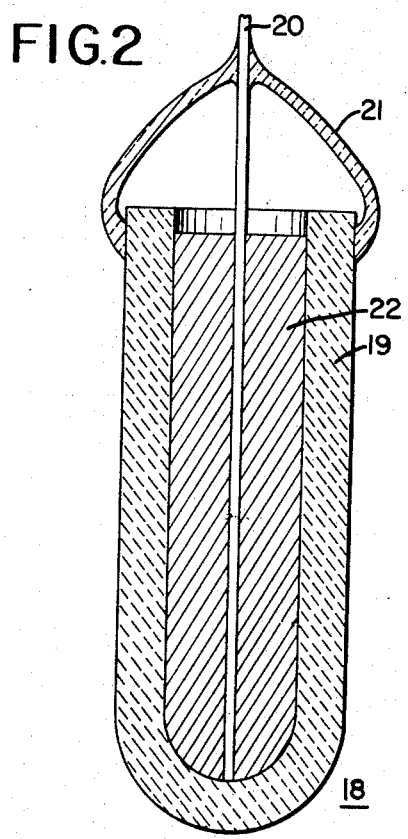
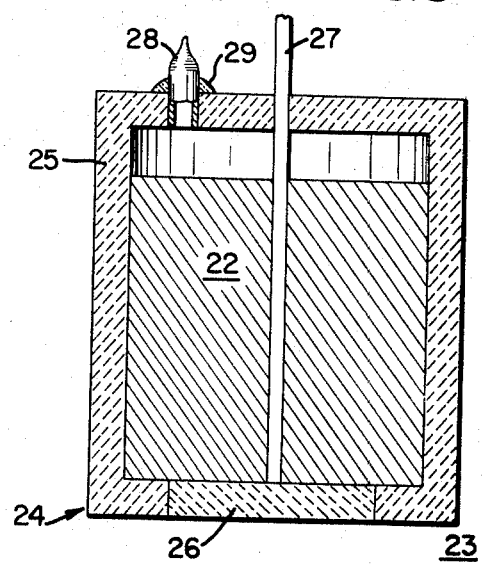

United States Patent Office 3,740,206
Patented June 19, 1973

3,740,206
METHOD FOR MAKING SEALED CONTAINER FOR ELEMENTAL SODIUM AND METHOD OF FORMING
Harold A. Christopher, Scotia, N.Y., assignor to General Electric Company
Original application Mar. 27, 1969, Ser. No. 811,015, now Patent No. 3,607,405. Divided and this application June 28, 1971, Ser. No. 157,654
Int. Cl. H01m 21/14; C03b 23/20
U.S. Cl. 65—36                2 Claims

ABSTRACT OF THE DISCLOSURE

An evacuated, sealed container for pure elemental sodium is disclosed which has a casing, an ionic conducting portion in the casing, an electronic conductor in contact with the interior surface of the ionic conducting portion and extending outwardly from the casing. Such a container, when it is filled with pure elemental sodium, provides a suitable device for storing and dispensing the pure elemental sodium, or provides a sodium electrode with an associated ionic conducting electrolyte. A method is also described for forming such an evacuated, sealed container, and for filling the container with pure elemental sodium.

---

This application is a division of application Ser. No. 811,015, filed Mar. 27, 1969, now Pat. 3,607,405 and assigned to the same assignee as the present application.

This invention relates to sealed containers and methods of making such containers, and, more particularly, to evacuated, sealed containers for pure elemental sodium, and methods of making and filling such containers, and dispensing pure elemental sodium from such containers.

Sodium is a desirable material in its pure elemental form. Various prior art methods are known for producing elemental sodium, which methods are complex, expensive, time consuming, and subject the material to possible contamination. Pure elemental sodium is useful in a variety of processes and devices, particularly as a sodium electrode, for example, in a sodium-sulfur battery.

Many problems arise in the purification of sodium for use as a sodium electrode in a battery. A serious problem concerns filling a portion of such a battery with sodium to provide the anodic reactant. My invention is directed to a novel evacuated, sealed container for storing such sodium, and to improved methods of forming such a container, of filling the container with pure elemental sodium, and of dispensing pure elemental sodium from the container.

It is a primary object of my invention to provide a new evacuated, sealed container for pure elemental sodium.

It is another object of my invention to provide a method of forming such a container.

It is a further object of my invention to provide a method of filling such a container with pure elemental sodium, and of dispensing pure elemental sodium from such a container.

In accordance with one aspect of my invention, an evacuated, sealed container for elemental sodium comprises a casing, an ionic conducting portion in the casing, and an electronic conductor in contact with the interior surface of the ionic conducting portion and extending outwardly from the container casing.

These and various other objects, features and advantages of the invention will be better understood from the following description taken in connection with the accompanying drawing in which:

FIG. 1 is a sectional view of apparatus employed to fill a novel evacuated, sealed container with pure elemental sodium in accordance with my invention;

FIG. 2 is a sectional view of an evacuated, sealed container for pure elemental sodium made in accordance with my invention; and FIG. 3 is a sectional view of a modified evacuated, sealed container for pure elemental sodium.

In FIG. 1 of the drawing there is shown generally at 10 an apparatus for electronically filling in accordance with my invention an evacuated, sealed container with pure elemental sodium. Apparatus 10 comprises a crucible 11 which is filled with a suitable source of sodium ions such as molten sodium compound 12. Crucible 11 is made of a material which is chemically stable in the presence of the sodium compound and which is electronically conductive. A cover portion 13 which has a central opening 14 therein is shown as closing the upper end of crucible 11. Such a cover is required only when the source of sodium ions would react with oxygen or with water vapor. A D.C. power source 15 is shown in the form of a battery which has a lead 16 connected from its positive terminal to crucible 11 which serves as an electrode. A lead 17 is connected from the negative terminal of battery 15 to the electronic conductor of the evacuated, sealed container 18 of my invention, which conductor serves as the other electrode.

In FIG. 2 of the drawing, container 18 is shown in greater detail as comprising a casing 19 which is shown as made completely of an ionic conducting material such as beta-alumina. My invention requires that at least a portion of the casing be comprised of such an ionic conducting material. An electronic conductor in the form of a wire lead 20 is in contact with the interior surface of the ionic conducting material forming casing 19. The opposite end of lead 20 is connected to lead 17 from the negative terminal of battery 15 as shown in FIG. 1. Casing 19 is retained in an avacuated and sealed condition by means of an appropriate seal such as glass seal 21 which extends from the open end of casing 19 to lead 20. Casing 19 is shown filled with solid, pure elemental sodium 22.

In FIG. 3 of the drawing, there is shown a modified evacuated, sealed container 23 which comprises a casing 24 composed of a high temperature ceramic material 25 and an ionic conducting portion 26 fitted in the lower casing wall. An electronic conductor in the form of a wire lead 27 is in contact with the interior surface of the ionic conducting portion 26 of casing 24 and extends outwardly from the upper portion of the casing. A sealing port 28 which is surrounded further by a seal 29 of an appropriate material such as glass is provided to maintain the container in an evacuated, sealed condition. Casing 24 is shown filled with solid, pure elemental sodium 22.

I discovered unexpectedly that I could form an evacuated, sealed container for pure elemental sodium which comprises a casing, an ionic conducting portion in the casing, and an electronic conductor in contact with the interior surface of the ionic conducting portion and extending outwardly from the casing. I found further that such a casing could be electrochemically filled with pure elemental sodium thereby providing an evacuated, sealed storage container for high purity sodium, or providing an anode-electrolyte assembly for subsequent use as a sodium electrode, for example, in a sodium-sulfur battery.

I found further that such an evacuated, sealed container could be formed by providing a casing with an ionic conducting portion, positioning an electronic conductor in contact with the interior surface of the ionic conducting portion and extending outwardly from the casing, evacuating the casing and sealing the casing. I found further that such an evacuated, sealed container could be electrochemically filled with pure elemental sodium by immersing the ionic conducting portion of the sealed casing in a bath filled with a suitable source of sodium ions, and applying a D.C. potential across the ionic conducting portion by means of the crucible and the electronic conductor which function as electrodes whereby the casing is filled with pure elemental sodium.

The evacuated, sealed container includes at least a portion of its casing made of an ionic conducting material. It is preferable that the immersed portion of the casing which is not made of ionic conducting material be electrically insulating so that such a container can be filled with pure elemental sodium as will be described further in detail. The evacuated, sealed containers of my invention are particularly desirable for the production and the storage of pure elemental sodium and when filled with pure elemental sodium as an anode-ionic electrolyte assembly for use as a sodium electrode in a sodium-sulfur battery or as a sodium reference electrode.

The ionic conducting portion is preferably made of sodium beta-alumina which is not a form of aluminum oxide $Al_2O_3$ but is a sodium aluminate with the generally accepted formula $Na_2O \cdot 11Al_2O_3$. The high ionic conductivity of this material has been previously recognized in the literature. This material is known as an ionic conducting material or as an ionic solid electrolyte in that associated reactive materials are constrained to combine by ion transport through the material and electron transport through an external circuit where the free energy change corresponding to the cell reaction is extracted as useful electrical energy. Beta-alumina is used as a solid ionic conducting material or electrolyte in a sodium-sulfur battery which is described for example in U.S. Letters Patent 3,404,035—Kummer et al., issued Oct. 1, 1968; 3,404,036—Kummer et al., issued Oct. 1, 1968; or 3,413,-150—Kummer et al., issued Nov. 26, 1968. Other ionic conducting materials are suitable for such containers, which materials include glasses, principally those in the sodium-alumina-silica system.

An electronic conductor is incorporated as part of the container structure which electronic conductor is in contact with the interior surface of the ionic conducting portion of the casing and extends outwardly through the casing. This electronic conductor is employed initially during the filling of the container with molten sodium and subsequently can be employed as the electrical lead for such as structure if it is employed in a sodium-sulfur battery, or can be employed during removal of the sodium from the container.

Such an electronic conductor can be made of a wide variety of materials and in a wide variety of configurations. While the electronic conductor is shown in the drawing as a wire lead in contact with the interior surface of the ionic material, such a conductor can take the form of a lead with additional material such as an electrically conducting mesh or wool adjacent to the interior surface to provide an increased area of contact. Furthermore, the electronic conductor can be in the form of a tube through which the container can be evacuated and the tube either provided with a valve or sealed off permanently. Since the material to be employed within the container is liquid or solid sodium, metals for such an electrical connnection include nickel, stainless steels, Armco iron, etc.

While various configurations for the container are possible, the casing is preferably made of an ionic conducting material which is sealed to the electronic conductor by means of a suitable glass seal. Such a seal can be made from a variety of glasses, particularly high melting point glasses which are resistant to attack by sodium.

In an illustrative operation of apparatus 10 shown in FIG. 1 of the drawing, a crucible 11 with a cover 13 having an opening 14 therein is filled with a suitable source 12 of sodium ions such as, for example, a sodium polysulfide, sodium hydroxide, sodium nitrate, elemental sodium, etc. The sodium compound 12 is maintained at a sufficient elevated temperature so that it is in molten condition. For example, sodium polysulfide is maintained at about 300° C. while elemental sodium is maintained at about 100° C. to be in a molten state. With either of these sodium ion sources, the above cover 13 would be employed. An evacuated, sealed container 18 which was described above, has at least a portion of its ionic conducting material immersed in the molten sodium compound 12. Electronic conductor 20 is connected to a lead 17 which in turn is connected to the negative terminal of a D.C. power source such as a battery 15. The positive terminal of the battery is connected by a lead 16 to the crucible 11 which serves as the counter electrode.

Prior to immersion of the evacuated, sealed container 18 in the molten sodium compound so that it can be filled with liquid sodium, the sealed container is prepared preferably by providing electronic conductor 20 in contact with the interior surface of a casing made of a material such as beta-alumina. One end of a glass tube is sealed to the open end of the casing. This assembly is then simultaneously evacuated, helium leak tested and baked out preferably at a temperature of about 350° C. for several hours. The other end of the glass tube is then sealed to conductor 20 thereby providing a sealed, evacuated container.

This container is then immersed in the molten sodium compound. A D.C. potential is then applied whereupon sodium ions from the sodium polysulfide bath are transported through the ionic conducting material of the casing and discharged initially on the electronic conductor in contact with the ionic conducting portion and subsequently at the interface of the sodium and the ceramic. After the casing has been filled with liquid sodium, the power supply is discontinued, the evacuated, sealed container is removed from the molten bath, the lead 17 is disconnected from the conductor 20, and the evacuated, sealed container is cooled. This process results in an evacuated, sealed container filled with pure metallic sodium. The filled container can be stored in air with no adverse effect on the contained sodium. Additionally, the sealed container constitutes a sodium electrode with an associated ionic conducting electrolyte which can be employed, for example, with a sulfur cathode to form a sodium-sulfur battery, or the sodium can be electrochemically dispensed from this container.

Examples of sealed containers and methods of forming such sealed containers in accordance with my invention are set forth below:

EXAMPLE 1

A plurality of sealed containers were made as shown in FIG. 2 of the drawing. Each container was made by milling sodium beta-alumina powder to a particle size less than about one and preferably greater than about ⅓ micron in maximum diameter. To the resulting powder was added sodium carbonate of a similar particle size, bringing the concentration of the sodium oxide to about 5 to 6 weight percent of the mixture and hence close to the composition for $Na_2O \cdot 11Al_2O_3$. This powder was then mixed with a sodium hydroxide solution to form a slurry which was extruded in a conventional manner in the form of a tube. Each tube was pinched at one end to close the end and dried in air, after which each tube was fired in an oxygen rich atmosphere at about 1825° C. for a period of two hours. This resulted in a fired or finished casing for each of the containers. An electronic lead in the form of a 1/16 inch metal rod of an alloy of 20% nickel, 17% cobalt, 0.2% manganese, and the balance iron was positioned within each casing to be in contact with the interior surface of the beta-alumina conducting material. One end of a glass tube of high melting point and sodium resistance was sealed to the open end of each casing by heating the glass around this edge. With a metal rod held in position within each casing, the other end of each glass tube was connected to the evacuation system of a helium leak detector. A resistance heater was positioned around this assembly which was heated to a temperature of about 350° C. for two hours while the assembly was evacuated and helium leak tested. A portion of the glass tube, the other end of which was affixed to the beta-alumina casing, was joined to the lead by heating the exterior surface of the glass thereby forming a leaktight seal with the lead. This method resulted in producing a plurality of evacuated, sealed containers each of which had a casing of ionic conducting material of beta-alumina, and an electronic conductor in contact with the interior surface of the ionic conducting material and extending outwardly from the casing.

EXAMPLE 2

A sealed container as formed above in Example 1 was immersed in a molten bath of sodium polysulfide contained in a graphite crucible having a cover with a central aperture therein. The electronic conductor from the container was connected to the negative terminal of a battery power source while the positive terminal of the battery was connected to the crucible. Power was supplied at 3 to 4 volts and at a current from 10 milliamperes to 1 ampere over a period of 120 minutes during which time sodium ions from the sodium polysulfide bath were transported ionically through the beta-alumina material and discharged within the interior of the evacuated, sealed container. The power source was then discontinued and the evacuated, sealed container removed from the bath. The battery lead was disconnected and the casing was allowed to cool. This resulted in an evacuated, sealed container of the above type filled with pure elemental sodium.

EXAMPLE 3

An evacuated, sealed container as formed above in Example 1 was immersed in a molten bath of sodium hydroxide contained in an open graphite crucible. The electronic conductor from the container was connected to the negative terminal of a battery power source while the positive terminal of the battery was connected to the crucible. Power was supplied at 3 volts and at a current from 10 milliamperes to 1 ampere over a period of 60 minutes during which time sodium ions from the sodium hydroxide bath were transported ionically through the beta-alumina material and discharged into the interior of the evacuated, sealed container. The power source was then discontinued and the evacuated, sealed container removed from the bath. The battery lead was disconnected and the casing was allowed to cool. This resulted in an evacuated, sealed container of the above type filled with pure elemental sodium.

EXAMPLE 4

A sealed container as formed above in Example 1 was immersed in a molten bath of sodium nitrate contained in an open graphite crucible. The electronic conductor from the container was connected to the negative terminal of a battery power source while the positive terminal of the battery was connected to the crucible. Power was supplied at 3 volts and at a current from 10 milliamperes to 1 ampere over a period of 60 minutes during which time sodium ions from the sodium nitrate bath were transported ionically through the beta-alumina material and discharged within the interior of the evacuated, sealed container. The power source was then discontinued and the evacuated, sealed container removed from the bath. The battery lead was disconnected and the casing was allowed to cool. This resulted in an evacuated, sealed container of the above type filled with pure elemental sodium.

EXAMPLE 5

A sealed container as formed above in Example 1 was immersed in a molten bath of elemental sodium contained in a nickel crucible having a cover with a central aperture therein. A nitrogen gas blanket was provided above the cover. The electronic conductor from the container was connected to the negative terminal of a battery power source while the positive terminal of the battery was connected to the crucible. Power was supplied at 3 to 4 volts and at a current from 10 milliamperes to 1 ampere over a period of 120 minutes during which time sodium ions from the elemental sodium bath were transported ionically through the beta-alumina material and discharged within the interior of the evacuated, sealed container. The power source was then disconnected and the evacuated, sealed container removed from the bath. The battery lead was disconnected and the casing was allowed to cool. This resulted in an evacuated, sealed container of the above type filled with pure elemental sodium.

EXAMPLE 6

A sealed container which was formed in accordance with Example 2 was surrounded by a sulfur-graphite slurry within an outer casing. A lead was provided for the sulfur-graphite slurry which acted as the cathode. The system was heated to 300° C. and a D.C. potential of 2.08 volts was observed. An electrical load of 5 ohms was then provided across the sodium anode lead and the sulfur cathode lead thereby generating a current of 0.361 ampere. In this manner, the sealed container functioned as a sodium anode and ionically conducting electolyte for a sodium-sulfur power source.

EXAMPLE 7

A sealed container which was formed in accordance with Example 3 was surrounded by sulfur and graphite felt within an outer nickel casing, which casing served as the cathode current collector. The system was heated to 300° C. and a D.C. potential of 2.08 volts was observed. An electrical load of 2 ohms was provided across the sodium anode lead and the sulfur cathode lead thereby generating a current of 0.754 ampere. In this manner, the sealed container functioned as a sodium anode and ionically conducting electrolyte for a sodium-sulfur power source.

EXAMPLE 8

A sealed container which was formed in accordance with Example 4 was surrounded by a sulfur-graphite slurry within an outer casing. A lead was provided for the sulfur-graphite slurry which acted as the cathode. The system was heated to 300° C. and a D.C. potential of 2.08 volts was observed. An electrical load of 1.0 ohm was then provided across the sodium anode lead and the sulfur cathode lead thereby generating a current of 1.182 amperes. In this manner, the sealed container functioned as a sodium anode and ionically conducting electrolyte for a sodium-sulfur power source.

EXAMPLE 9

A sealed container which was formed in accordance with Example 5 was surrounded by a sulfur-graphite slurry within an outer casing. A lead was provided for the sulfur-graphite slurry which acted as the cathode. The system was heated to 300° C. and a D.C. potential of 2.08 volts was observed. An electrical load of 1.0 ohm was then provided across the sodium anode lead and the sulfur cathode lead thereby generating a current of 1.182 amperes. In this manner, the sealed container functioned as a sodium anode and ionically conducting electrolyte for a sodium-sulfur power source.

EXAMPLE 10

The sodium-sulfur power source of above Example 9 was recharged by heating the system to 300° C. and applying a D.C. potential up to 2.1 volts.

While other modifications of the invention and variations thereof which may be employed within the scope of the invention have not been described, the invention is intended to include such as may be embraced within the following claims.

What I claim as new and desire to secure by Letters Patent of the United States is:

1. A method of forming an evacuated, sealed container for pure elemental sodium which comprises providing a casing with an ionic conducting portion, positioning a sodium beta-alumina electronic conductor in contact with the interior surface of the ionic conducting portion and extending outwardly from the casing, evacuating the casing, and sealing the casing.

2. A method of forming an evacuated, sealed container as in claim 1, wherein the ionic conducting portion of the sealed casing is immersed at least partially in a bath providing a source of sodium ions, the electronic conductor is connected to the negative terminal of a D.C. power source and the bath is connected to the positive terminal of the same source, and a D.C. potential is applied across the ionic conducting portion of the casing thereby filling the casing with pure elemental sodium.

References Cited

UNITED STATES PATENTS

| | | | |
|---|---|---|---|
| 3,404,035 | 10/1968 | Kummer et al. | 136—83 R X |
| 3,471,392 | 10/1969 | Kansky | 136—153 X |
| 3,475,225 | 10/1969 | Tennenhouse | 136—153 |
| 3,576,730 | 4/1971 | Spacil | 136—153 X |
| 3,634,141 | 1/1972 | Hirashima | 136—6 X |

ROBERT L. LINDSAY, JR., Primary Examiner

U.S. Cl. X.R.

65—59; 136—20, 153